Patented Feb. 24, 1953

2,629,709

UNITED STATES PATENT OFFICE 2,629,709

EMULSION POLYMERIZATION OF VINYL-IDENE COMPOUNDS IN THE PRESENCE OF CARBAMATES OF POLYAMINES

Carl A. Uraneck and Alvin C. Rothlisberger, Borger, Tex., assignors to Phillips Petroleum Company, a corporation of Delaware No Drawing. Application September 5, 1950, Serial No. 183,304

17 Claims. (Cl. 260—84.7)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins.

With the increasing interest in low temperature emulsion polymerization, many variations in recipes and procedure have been developed in the interest of economy and efficiency in addition to the attention given to producing polymeric materials having the desired characteristics. Recipes of the redox type, that is, formulations wherein both oxidizing and reducing components are present, have been widely used. Oxidizing components frequently employed include materials of a peroxidic nature, and particularly compounds such as benzoyl peroxide and cumene hydroperoxide. Even though any peroxidic material might be expected to function in the capacity of the oxidant in a redox emulsion polymerization system, this is not necessarily the case since in some instances little, if any, polymerization occurs while in other cases with different peroxides the reaction takes place at a satisfactory rate. Some peroxides may function fairly satisfactorily at higher temperatures but are of little value when it is desired to carry out polymerizations at low temperatures, say below the freezing point of water.

We have now discovered that excellent polymerization rates are obtained when liquid vinylidene compounds, polymerizable when dispersed in an aqueous medium, are dispersed in an aqueous medium and polymerized in the presence of a polymerization catalyst composition comprising an organic peroxide as an oxidant and a carbamate of a polyamino compound as a reductant. In general, when such a carbamate is employed as a component of the polymerization catalyst composition, polymerization occurs at a more uniform rate, particularly in the early stages of the reaction, than when the corresponding polyamino compound is used. With the latter compounds, polymerization occurs very rapidly at first and is often followed by a marked decrease in the rate. In some instances there is even a cessation of the reaction before the desired conversion is reached. This rapid reaction, or surge, at the beginning makes temperature control difficult in plant operation. This problem is alleviated through the use of a carbamate of a polyamino compound as activator. Good ultimate conversions are realized when these activators are used and, in many instances, the conversion reached is equal to or exceeds that obtained when polyethylene-polyamines are employed. It has also been found that various batches or lots of what is purported to be the same polyamino compound, such as various lots of tetraethylenepentamine, do not exhibit the same activity when used in what are otherwise identical polymerization recipes. When such lots of a polyamine are converted to the carbamate and this compound is then used as disclosed herein, more reproducible results are obtained, without such unpredictable and uncontrollable variations. In addition to the foregoing advantages, these recipes afford a means for effecting polymerization reactions in the absence of heavy metal salt activators.

An object of this invention is to polymerize unsaturated organic compounds.

Another object of this invention is to produce synthetic rubber.

A further object of this invention is to polymerize a monomeric material comprising a conjugated diene while dispersed in an aqueous medium.

Still another object of this invention is to effect rapid polymerization at low polymerization temperatures of monomeric materials dispersed in aqueous media.

Further objects and advantages of this invention will become apparent, to one skilled in the art, from the accompanying disclosure and discussion.

The carbamates used in the process of this invention are prepared by the interaction of carbon dioxide with a polyamino compound. These compounds which serve as reductants for the polymerization can be employed as single compounds or mixtures of homologous compounds, such as carbamates of hydrazine, ethylenediamine, diethylenetriamine, 2-methyl-3-azapentane-1,5-diamine, N - (2-hydroxyethyl) - 1,2-ethanediamine, N-phenylethylenediamine, N-cyclohexyl-N'-(2-aminoethyl) - 1,2-ethanediamine, tetraethylenepentamine, N(2 - hydroxy-tertiary-butyl) 1,2-propylenediamine, and the like. The polyamino compounds from which the carbamates are prepared have the general formula RHN(CHXCHXNH)$_m$(CHXCHX)$_n$NH$_2$, where R contains not more than eight carbon atoms and is of the group consisting of hydrogen, aliphatic, cycloaliphatic, aromatic, olefinic and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents, some of which will have the effect of making the carbamates more water-soluble and less oil (hydrocarbon)-soluble; particularly useful non-hydrocarbon substituents include oxygen in the form of hydroxy and ether compounds, sulfur in similar compounds, (i. e., mercapto compounds and thioethers), and halogen compounds. The carbamates are prepared from the above described polyamino compounds, are preferably the monocarbamates, and probably can be represented by the formulae RHN(CHXCHXNH)$_m$(CHXCHX)$_n$N(H)COOM where M may be hydrogen or an alkali metal or ammonium. Carbon dioxide can also react with one or more of the secondary nitrogen atoms, thus forming dicarbamates, and similar higher polycarbamates. When R is hydrogen, the formula for the monocarbamate is frequently represented thus:

+H$_3$N(CHXCHXNH)$_m$(CHXCHX)$_n$NHCOO−

These compounds appear to act as reductants and/or activators in the polymerization mixture and no other activating ingredients, such as compounds of polyvalent-multivalent metals, need be added in order to obtain satisfactory and rapid polymerization of the monomeric material, except as such compounds may fortuitously be present in the polymerization mixture. Similarly, no other reducing ingredient, such as a reducing sugar, need be added.

The carbamates are readily prepared in high yields by adding excess solid or gaseous carbon dioxide to a polyamino compound, such as described above, in the presence of a solvent such as water and/or an alcohol, preferably ethyl, a propyl, or a butyl alcohol. The amount of solvent employed will generally be in the range from 1 to 20 parts per part of amine by weight. Carbon dioxide is added to the amine solution with constant stirring until heat is no longer evolved. Cooling is effected by any suitable means. During addition of the carbon dioxide the mixture takes on the appearance of a heavy, viscous oil from which a white solid separates when additional carbon dioxide is introduced. The solvent is removed by decantation, filtration, or other suitable means and the solid product is then washed with additional solvent and dried. When preparation of the carbamate is carried out in an open vessel, i. e., at atmospheric pressure, the product is predominantly the monocarbamate with only small amounts of the dicarbamate being formed. When the reaction is carried out under pressure, the reaction proceeds in the direction of the dicarbamate. This method for the preparation of carbamates is adapted from the method used by Mulvaney and Evans, Ind. Eng. Chem. 40, 393–397 (1948).

The organic peroxide used as the oxidant component of the polymerization catalyst should have solubility properties such that the major portion of it is present in the liquid monomer phase, rather than in the aqueous medium, under the polymerization conditions. In general, two groups of organic peroxides can be used, those having the formula ROOH, known as hydroperoxides or hydroperoxymethanes, and those having the formula ROOR, where R in each instance is an organic radical. These two groups are not equivalents, however, and the hydroperoxides are preferred. The preferred hydroperoxides can be represented by the formula RR'R''COOH wherein R is selected from the group consisting of hydrogen and organic radicals, and each of R' and R'' is an organic radical, or R'R'' together comprise a tetramethylene or pentamethylene group forming with the

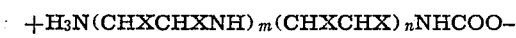

a cyclopentyl- or cyclohexylhydroperoxide. Each of R, R' and R'' can be completely hydrocarbon in character, and can be of mixed character, such as aralkyl, alkaryl, and the like, and can also have non-hydrocarbon substituents, some of which will have the effect of making them more water-soluble and less oil(hydrocarbon)-soluble; particularly useful non-hydrocarbon substituents include oxygen in the form of hydroxy and ether compounds, sulfur in similar compounds (i. e. mercapto compounds and thioethers), and halogen compounds. Examples of such hydroperoxides include diisopropyl hydroperoxide (isopropyl(dimethyl)-hydroperoxymethane), cumene hydroperoxide (phenyl(dimethyl) hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl (isopropylphenyl) hydroperoxymethane), methylethyl(ethoxyphenyl) - hydroperoxymethane, methyldecyl(methylphenyl) hydroperoxymethane, dimethyldecyl - hydroperoxymethane, methylchlorophenylphenylhydroperoxymethane, and tertiary-butylisopropylbenzene hydroperoxide (dimethyl(tertiary-butylphenyl) hydroperoxymethane). Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl)hydroperoxymethane.

One large group of these hydroperoxymethanes is that group in which each of the three substituent groups is a hydrocarbon radical. One of the subgroups of these compounds is the alkaryldialkyl hydroperoxymethanes, in which the two alkyl groups are relatively short, i. e. have from one to three or four carbon atoms each, including dimethyl(tertiarybutylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,-10a-octahydrophenanthrene, which forms the corresponding hydroperoxide upon oxidation, organic peroxides and hydroperoxides, preferably will have a total of not more than thirty carbon atoms per molecule, and the most active hydroperoxides usually have at least ten to twelve carbon atoms per molecule. Mixtures of these peroxides and/or hydroperoxides can be used, as desired.

The amount of carbamate used to obtain optimum results is dependent upon other ingredients in the recipe. Preferred results are usually obtained with between 0.02 and 5 parts by weight of the carbamate per 100 parts of monomeric material.

The amount of organic peroxide used to obtain an optimum reaction rate will depend upon the polymerization recipe employed and upon the reaction conditions. The amount is generally expressed in millimols per 100 parts of monomeric material, using in each instance the same units of weight throughout, i. e., when the monomeric material is measured in pounds the hydroperoxide is measured in millipound mols. The same is true for other ingredients in the polymerization recipe. An optimum rate of polymerization is usually obtained with the amount of hydroperoxymethane between 0.1 and 10 millimols per 100 parts by weight of monomeric material.

The monomeric material polymerized to produce polymers by the process of this invention comprises unsaturated organic compounds which generally contain the characteristic structure

and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The present invention is directed primarily to the production of polymers of conjugated dienes, which have physical properties classifying them as synthetic rubber, and the invention is particularly applicable to the polymerization of hydrocarbon monomeric materials. Such materials include 1,3-butadiene and other conjugated diolefin hydrocarbons having not more than six carbon atoms per molecule, halogen derivatives, such as chloroprene, fluoroprene, and the like, either alone, in admixture with each other, or together with minor amounts of unsaturated compounds which are copolymerizable therewith in aqueous emulsion, such as styrene, alpha methylstyrene, vinyltoluene chlorostyrene, etc. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols of higher boiling point than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization can be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

In preparing synthetic rubber by polymerizing conjugated dienes, by the process of this invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends or mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

One of the advantages of the polymerization recipes, as disclosed herein, is that they are applicable for use in the production of "high solids" latices, i. e., latices resulting from the use of a smaller amount of aqueous medium than is generally used in conventional polymerization procedures. For this type of operation the ratio of aqueous phase to monomeric material will generally be in the range from 0.5:1 to 1:1 and the extent of conversion will generally range from 70 per cent to substantially complete conversion.

Emulsifying agents which are applicable in these low temperature polymerizations are materials such as potassium laurate, potassium oleate, and the like, and salts of rosin acids, either alone or in admixture with each other. However, other emulsifying agents, such as nonionic emulsifying agents, salts of alkyl aromatic sulfonic acids, salts of alkyl sulfates, and the like which will produce favorable results under conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH may be within the range from 9 to 12 and it may be advantageous to have a pH higher than 12 in some instances. In most cases optimum results are obtained if the pH is 10 or higher.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex. Generally the amount of such salt will not exceed one part per 100 parts of monomers.

We generally use the carbamates discussed herein as activators in polymerization recipes at low polymerization temperatures, i. e., from about 30° C. to well below the freezing point of water, such as —40° C. or lower. However, temperatures as high as 60° C. or even higher may be employed if desired.

Advantages of this invention are illustrated by the following examples. The reactants, and their proportions, and the other specific ingredients of the recipes are presented as being typical and should not be construed to limit the invention unduly.

EXAMPLE I

Monocarbamates of diethylenetriamine, triethylenetetramine, and tetraethylenepentamine were prepared and employed in a series of butadiene-styrene copolymerizations at 5° C. For comparative purposes runs were also made using the corresponding polyethylenepolyamines. These carbamates were prepared by the following procedure.

A 10 per cent solution of the amine in methanol was placed in an Erlenmeyer flask fitted with an inlet tube containing a mercury pressure seal. Carbon dioxide was introduced in the gaseous form from a cylinder. The exact amount of carbon dioxide added was determined by the total increase in weight of the reaction vessel. As soon as the required amount of carbon dioxide had been added, the vessel was opened and the contents were poured into an equal volume of ether. The carbamate thus precipitated was filtered from the solution, washed with several portions of ether, and dried under vacuum over phosphorus pentoxide and paraffin. Yields obtained by this method ranged from 70 to 80 per cent.

The polymerization recipe was as follows:

| | Parts by weight |
|---|---|
| Butadiene | 70 |
| Styrene | 30 |
| Water | 180 |
| Soap flakes [1] | 5 |
| (pH of soap solution) | 11.0–11.4 |
| Potassium chloride | 0.4 |
| Mercaptan blend [2] | 0.1 |
| Tert.-butylisopropylbenzene hydroperoxide [3] | 0.42 (2.025 millimols) |
| Amine or carbamate | 0.5 |

[1] Potassium Office Rubber Reserve Soap.
[2] A blend of tertiary $C_{12}$, $C_{14}$, and $C_{16}$ aliphatic mercaptans in a ratio of 3 : 1 : 1 parts by weight.
[3] Produced by oxidation of tert.-butyl-isopropylbenzene, and considered to be $t\text{-}C_4H_9C_6H_4C(CH_3)_2O_2H$.

A mixture of the emulsifying agent, water, and potassium chloride was prepared and potassium hydroxide added to adjust the pH to 11.0–11.4. A solution of the hydroperoxide and mercaptan in styrene was then introduced, followed by the butadiene. The reactor was pressured to 30 pounds per square inch gauge with nitrogen and the temperature adjusted to 5° C. Ten parts of water was added to the carbamate or amine to make a solution which was charged to the reactor. Polymerization was effected in the conventional manner while the temperature was held at 5° C. The following results were obtained:

conversion is obtained and there is a smaller decrease in the polymerization rate as polymerization proceeds.

EXAMPLE II

The recipe of Example I was followed except that 0.76 part of either the carbamate or amine activator was used instead of 0.5 part and the pH of the emulsifier was 11. Mono- and dicarbamates of diethylenetriamine and triethylenetetramine were employed as activators as well as the corresponding amines. Polymerizations were effected at 5° C. The following results were obtained:

| | Conversion, Percent | | | | Rate per Hour at— | | | |
|---|---|---|---|---|---|---|---|---|
| | 1 Hr. | 3 Hrs. | 6 Hrs. | 24 Hrs. | 1 Hr. | 3 Hrs. | 6 Hrs. | 24 Hrs. |
| Diethylenetriamine monocarbamate | 7 | 23 | 40 | 85 | 7 | 7.7 | 6.7 | 3.5 |
| Diethylenetriamine dicarbamate | 4 | 19 | 31 | 76 | 4 | 6.3 | 5.2 | 3.2 |
| Diethylenetriamine | 17 | 35 | 56 | 97 | 17 | 11.7 | 9.4 | 4.0 |
| Triethylenetetramine monocarbamate | 15 | 37 | 55 | 93 | 15 | 12.3 | 9.2 | 3.9 |
| Triethylenetetramine dicarbamate | 10 | 26 | 44 | 92 | 10 | 8.7 | 7.3 | 3.8 |
| Triethylenetetramine | 22 | 47 | 70 | 99 | 22 | 15.7 | 16.7 | 4.1 |

These data show that when carbamates are employed, the polymerization rate at the beginning of the reaction is more gradual than when the corresponding amines are used and yet all runs give good ultimate conversions.

EXAMPLE III

The following recipe was employed for carrying out the copolymerization of butadiene with styrene at 5° C.:

| | Parts by weight |
|---|---|
| Butadiene | 70 |
| Styrene | 30 |
| Water, total | 180 |
| Rosin soap, K salt [1] | 4.7 |
| Trisodium phosphate, $Na_3PO_4$ | 0.5 |
| Potassium hydroxide | 0.153 |
| (pH soap solution) | 11.9 |
| Mercaptan blend [2] | 0.25 |
| Tert.-butylisopropylbenzene hydroperoxide [3] | 0.0624 (0.3 millimol) |
| Tetraethylenepentamine monocarbamate | 0.035 (0.15 millimol) |

[1] Dresinate S-149; soap prepared from a partially hydrogenated rosin
[2] As in Example I.
[3] As in Example I.

The procedure given in Example I was fol-

| | Conversion, Percent | | | Rate per Hour at— | | |
|---|---|---|---|---|---|---|
| | 3 Hours | 6 Hours | 22 Hours | 3 Hours | 6 Hours | 22 Hours |
| Diethylenetriamine carbamate | 16 | 33 | 83 | 5.3 | 5.5 | 3.5 |
| Diethylenetriamine | 15 | 32 | 77 | 5.0 | 5.4 | 3.2 |
| Triethylenetetramine carbamate | 31 | 53 | 94 | 10.3 | 8.8 | 3.9 |
| Triethylenetetramine | 39 | 68 | 94 | 13.0 | 11.3 | 3.9 |
| Tetraethylenepentamine carbamate | 43 | 83 | 98 | 14.3 | 13.8 | 4.1 |
| Tetraethylenepentamine | 55 | 87 | 94 | 18.3 | 14.5 | 3.9 |

In all cases, the ultimate conversion was as high or higher with the carbamate than with the corresponding amine. The carbamates also show greater uniformity in conversion rate, i. e. although the initial polymerization rate is lower when using the carbamate than when using the corresponding polyamine, the same high ultimate lowed. Two additional runs were made using 0.225 and 0.3 millimols, respectively, of the carbamate but otherwise the recipe was the same as that given above. For comparative purposes a control run was made using the same recipe but substituting 0.15 millimol tetraethylenepentamine for the carbamate. The following results were obtained:

| Activator | | Conversion, Percent | | | Rate per Hour at— | | |
|---|---|---|---|---|---|---|---|
| Type | Milli-mols | 3 Hrs. | 10 Hrs. | 22 Hrs. | 3 Hrs. | 10 Hrs. | 22 Hrs. |
| Carbamate [1] | 0.15 | 9 | 36 | 72 | 3 | 3.6 | 3.3 |
| Do | 0.225 | 7 | 38 | 71 | 2.3 | 3.8 | 3.3 |
| Do | 0.3 | 17 | 54 | 73 | 5.7 | 5.4 | 3.3 |
| Amine (control) [2] | 0.15 | 28 | 53 | 68 | 9.3 | 5.3 | 3.1 |

[1] Tetraethylenepentamine monocarbamate.
[2] Tetraethylenepentamine.

The above data show the regularity of conversion rate with the carbamate activator in contrast to the rapid polymerization rate in the beginning of the reaction when the corresponding amine is used as the activator. The data also show a better ultimate conversion when the carbamate is present.

EXAMPLE IV

Butadiene and styrene were copolymerized at 5° C. according to the following recipe:

| | Parts by weight |
|---|---|
| Butadiene | 70 |
| Styrene | 30 |
| Water, total | 180 |
| Rosin soap, K salt [1] | 4.7 |
| Sodium chloride | 0.4 |
| Potassium hydroxide | 0.151 |
| (pH soap solution) | 11.7 |
| Mercaptan blend [2] | 0.25 |
| Tert.-butylisopropylbenzene hydroperoxide [3] | 0.0624 (0.3 millimol) |
| Tetraethylenepentamine monocarbamate or | 0.035 (0.15 millimol) |
| Tetraethylenepentamine | 0.028 (0.15 millimol) |

[1] As in Example III.
[2] As in Example I.
[3] As in Example I.

The procedure of Example I was used and the following results were obtained:

| | Conversion, Percent | | | | Rate per Hour at— | | |
|---|---|---|---|---|---|---|---|
| | 3 Hrs. | 5.5 Hrs. | 10 Hrs. | 22 Hrs. | 3 Hrs. | 5.5 Hrs. | 10 Hrs. |
| Tetraethylenepentamine monocarbamate | 26 | 41 | 72 | 73 | 8.7 | 7.4 | 7.2 |
| Tetraethylenepentamine | 30 | 41 | 51 | 54 | 10 | 7.4 | 5.1 |

The run with the carbamate not only shows a more uniform conversion rate but it reached a higher conversion.

EXAMPLE V

Attempts were made to prepare activator solutions similar to the preceding amine carbamate solutions by either generating carbon dioxide in the presence of an aqueous amine solution or by adding gaseous carbon dioxide to an aqueous amine solution. The following polymerization recipe was used:

| | Parts by weight |
|---|---|
| Butadiene | 70 |
| Styrene | 30 |
| Water | 180 |
| Rosin soap, K salt [1] | 4.7 |
| Trisodium phosphate, $Na_3PO_4$ | 0.4 |
| Potassium hydroxide | 0.128 |
| (pH soap solution) | 11.8 |
| Mercaptan blend [2] | 0.25 |
| Tert.-butylisopropylbenzene hydroperoxide [3] | 0.0707 (0.34 millimol) |
| Tetraethylenepentamine-$CO_2$ reaction product | Variable |

[1] As in Example III.
[2] As in Example I.
[3] As in Example I.

In addition to runs made using the activator solutions prepared by the methods described above, three runs were also made using samples of the carbamate which had been previously prepared and isolated. These samples are designated as "original carbamate" in the following table which shows the results obtained with various millimol charges of the activator prepared by different methods.

| Activator | | Conversion, Percent | | | Rate per Hour at— | | |
|---|---|---|---|---|---|---|---|
| Method of Preparation | Milli-mols | 3 Hrs. | 6 Hrs. | 24 Hrs. | 3 Hrs. | 6 Hrs. | 24 Hrs. |
| $Na_2CO_3$+HCl | 0.225 | 27 | 50 | 85 | 9 | 8.3 | 3.5 |
| | 0.15 | 22 | 41 | 80 | 7.3 | 6.8 | 3.3 |
| | 0.075 | 7 | 18 | 46 | 2.3 | 3 | 1.9 |
| Dry Ice | 0.225 | 18 | 38 | 89 | 6 | 6.3 | 3.6 |
| | 0.15 | 15 | 31 | 84 | 5 | 5.2 | 3.5 |
| | 0.075 | 7 | 17 | 61 | 2.3 | 2.8 | 2.5 |
| Original Carbamate | 0.225 | 30 | 59 | 90 | 10 | 9.8 | 3.8 |
| | 0.15 | 18 | 35 | 83 | 6 | 5.8 | 3.4 |
| | 0.075 | 18 | 28 | 61 | 6 | 4.7 | 2.5 |

EXAMPLE VI

A series of runs was made to polymerize various monomeric materials. These runs were conducted at a polymerization temperature of 5° C., using, in each instance, the following basic recipe:

| Component | Parts by Weight |
|---|---|
| Monomeric material | 100 |
| Water [1] | 180 |
| Potassium ORR soap [1] | 5 |
| KCl | 0.25 |
| KOH | 0.034 |
| Mixed tertiary $C_{12}$–$C_{16}$ alkyl mercaptans | 0.2 |
| t-butylisopropylbenzene hydroperoxide | 0.208 (1 millimol) |
| Tepa carbamate [2] | 0.46 (1.6 millimols) |

[1] pH of soap solution, 11.2–11.3.
[2] Reaction product of 1 mol tetraethylenepentamine and 2.2 mols of carbon dioxide.

The following polymerization (per cent conversion) results were obtained.

*Polymerization data for various monomers polymerized in recipes activated with tetraethylenepentamine carbamate*

| Run | A | B | C | D | E | F | G |
|---|---|---|---|---|---|---|---|
| | Parts | | | | | | |
| Isoprene | 70 | --- | 70 | --- | --- | --- | --- |
| Ethyl methacrylate | --- | 100 | 30 | 30 | --- | --- | --- |
| Acrylonitrile | 30 | --- | --- | --- | --- | 20 | --- |
| Butadiene | --- | --- | --- | 70 | 70 | 70 | --- |
| Styrene | --- | --- | --- | --- | 30 | --- | 100 |
| | Conversion, Percent | | | | | | |
| Hours: | | | | | | | |
| 2.5 | 25 | 0 | 28 | 53 | 32 | --- | --- |
| 3.0 | --- | --- | --- | --- | --- | 70 | 75 |
| 5.25 | 27 | 0 | 61 | 87 | 67 | --- | --- |
| 24.5 | 28 | 0 | 97 | 100 | 99 | --- | --- |
| 93.0 | 33 | 92 | --- | --- | --- | --- | --- |

Further adjustment of the recipe gives better polymerization rates with those monomeric materials which resulted in a slow rate. It is interesting to note that fast rates were obtained with several monomeric materials comprising acrylonitrile, since it is known that good reaction rates are not readily obtained with a corresponding recipe in which a polyethylenepolyamine is used, where the carbamate was used, in such runs.

EXAMPLE VII

The following run was carried out with hydrazine carbamate as the reductant. The following recipe was employed, at a polymerization temperature of 5° C.

|  | Parts by weight |
|---|---|
| Butadiene | 70 |
| Styrene | 30 |
| Water | 180 |
| Fatty acid soap, K salt [1] | 5 |
| $Na_3PO_4 \cdot 12H_2O$ | 0.4 |
| KOH to an emulsifier pH of | 11.5 to 11.7 |
| Mercaptan blend [2] | 0.25 |
| Tert.-butylisopropylbenzene hydroperoxide | 0.42 (2 millimols) |
| Hydrazine carbamate | 0.304 (4 millimols) |

[1] Potassium Office Rubber Reserve Soap.
[2] A blend of tertiary $C_{12}$, $C_{14}$ and $C_{16}$ aliphatic mercaptans in a ratio of 3:1:1 parts by weight.

The following results were obtained:

| Time, Hours | Conversion, Percent |
|---|---|
| 17.4 | 8 |
| 25 | 6 |
| 94.5 | 52 |

EXAMPLE VIII

The following run was conducted with the monocarbamate of aminoethylethanolamine (N-(2-hydroxyethyl)-1,2-ethanediamine) as the reductant. The recipe employed was as follows, and the polymerization temperature was 5° C.

|  | Parts by weight |
|---|---|
| Butadiene | 70 |
| Styrene | 30 |
| Water | 180 |
| Potassium soap, ORR | 5 |
| $Na_3PO_4 \cdot 12H_2O$ | 0.4 |
| Tert.-butylisopropylbenzene hydroperoxide | 0.208 (1 millimol) |
| Alkyl mercaptan blend | 0.25 |
| Carbamate | 0.296 (2 millimols) |

A conversion of 25 per cent, of the monomeric material, was obtained in 7.5 hours, and 62 per cent in 16.5 hours.

As will be evident to those skilled in the art, various modifications of this invention can be made, or followed, in the light of the foregoing disclosure and discussion, without departing from the spirit or scope of the disclosure or from the scope of the claims.

We claim:

1. In the production of synthetic rubber by the polymerization of a monomeric material comprising a major portion of 1,3-butadiene and a minor portion of styrene while dispersed in an aqueous emulsion in the presence of a catalyst composition at a polymerization temperature, the improvement which comprises conducting said polymerization with the pH of said aqueous emulsion between 9 and 12 and using as said catalyst composition 0.1 to 10 millimols of $t\text{-}C_4H_9C_6H_4C(CH_3)_2O_2H$ together with 0.02 to 5 parts of a carbamate of tetraethylenepentamine, said amounts being per 100 parts by weight of said monomeric material.

2. In the polymerization of a monomeric material comprising an organic compound having an active

group and polymerizable while dispersed in an aqueous medium in the presence of an oxidant and a reducing composition at a polymerization temperature, the improvement which comprises using as said oxidant 0.1 to 10 millimols of an organic peroxide which is effective as an oxidant in said polymerization and present in said monomeric material in a greater concentration than in said aqueous medium and selected from the group consisting of compounds having the formula ROOR and compounds having the formula ROOH wherein R is an organic radical, and as said reducing composition 0.02 to 5 parts of a carbamate of a polyamino compound having the formula $RHN(CHXCHXNH)_m(CHXCHX)_nNH_2$ where R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0, said amounts being per 100 parts by weight of said monomeric material.

3. The process of claim 2 in which said organic peroxide is a trisubstituted hydroperoxymethane.

4. The process of claim 2 in which said organic peroxide is $t\text{-}C_4H_9C_6H_4C(CH_3)_2O_2H$.

5. The process of claim 2 in which said carbamate is a monocarbamate of tetraethylenepentamine.

6. The process of claim 2 in which said carbamate is a carbamate of diethylenetriamine.

7. The process of claim 2 in which said carbamate is a carbamate of triethylenetriamine.

8. The process of claim 2 in which said carbamate is a carbamate of hydrazine.

9. The process of claim 2 in which said carbamate is a carbamate of N-(2-hydroxyethyl)-1,2-ethanediamine.

10. A process for polymerizing a monomeric material comprising a conjugated diene having from four to six carbon atoms per molecule, which comprises polymerizing said monomeric material while dispersed in an aqueous medium in the presence of a polymerization catalyst composition comprising an oxidant and a reductant in which said oxidant is an organic hydroperoxide having ten to thirty carbon atoms per molecule effective as an oxidant in said polymerization and present in said monomeric material in a greater concentration than in said aqueous medium and having the formula ROOH wherein R is an organic radical, and said reductant is a carbamate of a polyamino compound having the formula $RHN(CHXCHXNH)_m(CHXCHX)_nNH_2$ where R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0.

11. A process for polymerizing a monomeric material comprising an unsaturated organic compound having an active

group and polymerizable when dispersed in an aqueous medium, which comprises polymerizing said monomeric material while dispersed in an aqueous medium in the presence of a polymerization catalyst composition comprising an oxidant and a reductant in which said oxidant is an organic hydroperoxide having ten to thirty carbon atoms per molecule effective as an oxidant in said polymerization and present in said monomeric material in a greater concentration than in said aqueous medium and having the formula ROOH wherein R is an organic radical, and said reductant is a carbamate of a polyamino compound having the formula $$RHN(CHXCHXNH)_m(CHXCHX)_nNH_2$$

where R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0.

12. A process for polymerizing a monomeric material comprising a conjugated diene having from four to six carbon atoms per molecule, which comprises polymerizing said monomeric material while dispersed in an aqueous medium in the presence of a polymerization catalyst composition comprising an oxidant and a reductant in which said oxidant is an organic hydroperoxide having ten to thirty carbon atoms per molecule effective as an oxidant in said polymerization and present in said monomeric material in a greater concentration than in said aqueous medium and having the formula ROOH wherein R is an organic radical, and said reductant is a carbamate of tetraethylenepentamine.

13. A process for the polymerization of a monomeric material comprising an organic compound having an active

group and polymerizable while dispersed in an aqueous medium, which comprises polymerizing said monomeric material while dispersed in the presence of an emulsifying agent in an aqueous medium at a polymerization temperature in the presence of an oxidant-reductant polymerization catalyst composition comprising a trisubstituted hydroperoxymethane as said oxidant and a carbamate of an ethylene polyamine having not more than nine ethylene groups as said reductant.

14. The process of claim 13 in which said monomeric material comprises a major portion of a conjugated diolefin hydrocarbon having four to six carbon atoms per molecule and said hydroperoxymethane is an alkaryl-dialkyl hydroperoxymethane.

15. In the polymerization of a monomeric material comprising an organic compound having an active

group and polymerizable while dispersed in an aqueous medium at a polymerization temperature in the presence of an oxidant-reductant polymerization catalyst comprising an organic peroxide and a reductant, said organic peroxide being effective as an oxidant in said polymerization and present in said monomeric material in a greater concentration than in said aqueous medium and selected from the group consisting of compounds having the formula ROOR and compounds having the formula ROOH wherein R is an organic radical, the improvement which comprises using as said reductant a carbamate of a polyamino compound having the formula $RHN(CHXCHXNH)_m(CHXCHX)_nNH_2$ where R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0.

16. A process for the polymerization of a monomeric material comprising an organic compound having an active

group and polymerizable while dispersed in an aqueous medium, which comprises polymerizing said monomeric material while dispersed in the presence of an emulsifying agent in an aqueous medium having a pH between 9 and 12 at a polymerization temperature between 30 and $-40°$ C. in the presence of a polymerization catalyst composition comprising 0.1 to 10 millimols of an organic peroxide which is effective as an oxidant in said polymerization and present in said monomeric material in a greater concentration than in said aqueous medium and selected from the group consisting of compounds having the formula ROOR and compounds having the formula ROOH wherein R is an organic radical, and 0.02 to 5 parts by weight of a carbamate of an ethylenepolyamine having not more than nine ethylene groups, said amounts being per 100 parts by weight of said monomeric material.

17. A process for the production of synthetic rubber, which comprises polymerizing a monomeric material comprising a major portion of a conjugated diene having four to six, inclusive, carbon atoms per molecule while dispersed in the presence of an emulsifying agent in an aqueous medium at a polymerization temperature between 30 and $-40°$ C. in the presence of a polymerization catalyst composition comprising 0.1 to 10 millimols of a trisubstituted hydroperoxymethane and 0.02 to 5 parts by weight of a carbamate of an ethylenepolyamine having not more than nine ethylene groups, said amounts being per 100 parts by weight of said monomeric material.

CARL A. URANECK.
ALVIN C. ROTHLISBERGER.

REFERENCES CITED

The following references are of record in the file of this patent:

OTHER REFERENCES

Whitby et al., Rubber Age, vol. 65, No. 5, Aug. 1949, page 545.